June 23, 1964 M. J. DE GOOD ETAL 3,138,238
POWERED DIVERTER
Filed April 16, 1962 3 Sheets-Sheet 1

INVENTORS
MAYNARD J. DEGOOD
CLYDE BOWMAN
BY
Price & Heneveld
ATTORNEYS

June 23, 1964  M. J. DE GOOD ETAL  3,138,238
POWERED DIVERTER

Filed April 16, 1962  3 Sheets-Sheet 2

INVENTORS
MAYNARD J. DEGOOD
CLYDE BOWMAN
BY *Price & Heneveld*
ATTORNEYS

United States Patent Office 3,138,238
Patented June 23, 1964

3,138,238
POWERED DIVERTER
Maynard J. De Good and Clyde Bowman, Grand Rapids, Mich., assignors to The Rapids-Standard Company, Inc., Grand Rapids, Mich., a corporation of Michigan
Filed Apr. 16, 1962, Ser. No. 187,529
8 Claims. (Cl. 198—127)

This invention relates to conveyors, and more particularly to diverter mechanisms by which goods traveling on a conveyor can be selectively switched onto another conveyor diverging at an obtuse or right angle therefrom.

Various mechanisms by which goods traveling on a standard conveyor can be angularly diverted therefrom have been proposed in the past. However, such devices were either rather complex in operation and subject to maintenance problems, or unreliable in their functioning, particularly if the goods moved very slowly, or very fast, had a relatively slippery undersurface, or varied substantially in weight or size. The problem to be solved by this invention was therefore to provide a simple diverter mechanism which could be readily installed on any standard type of conveyor without structural modifications, and which was positive, reliable, and troublefree in its operation, particularly at high conveying speeds (i.e. in excess of 100 feet per minute), without requiring a separate drive power source.

The present invention solves this problem by providing diverter wheels which can be readily inserted in a standard conveyor frame, and a lifting mechanism which, when actuated, raises the diverter wheels above the surface of the conveyor.

In one embodiment of the invention, particularly adapted for use on live roller conveyors, the drive belt of the conveyor is engaged with the diverter wheels when they are in their raised position, so as to positively drive the diverter wheels at a peripheral velocity equal to that of the live rollers of the conveyor. Special provisions to avoid excessive belt wear are made in this embodiment by limiting the friction which can be applied between the belt and the diverter wheels. The combination of the raised diverter wheels and their powering by the same belt which drives the conveyor rollers results in an inexepnsive, positively acting diverter mechanism which is not prone to malfunction due to slippage of the conveyed article on the diverter wheels or conveyor rollers, or due to stopping of the article when it hits the diverter wheels at low speeds.

In another embodiment of the invention particularly adapted for use on wheel conveyors, the diverter wheels are not powered but instead are provided with article-engaging surfaces having a very high coefficient of friction. For example, the diverter wheels may be coated with polyurethane. This results in positive diversion even at high conveying speeds.

In both embodiments, provisions are made for raising the diverter wheels by a lever action applied to the diverter wheel assembly, rather than (as was done in the prior art) by applying torsional force to a pivot shaft on which the diverter wheel assembly was eccentrically supported. This improvement makes it possible to relieve the diverter mechanism of the mechanical stresses resulting from the impact of heavy articles against the diverter wheels. In addition, the present invention teaches the use of a toggle arrangement by means of which the weight of an article being diverted is supported by a fixed member of the diverter structure rather than being transmitted to the mechanical, electromechanical or fluid-operated actuating member itself. Hence there is no tendency for the diverter wheels to leave their raised position when a heavy article travels over them, and consequently, the actuating member need only be just strong enough to raise the weight of the diverter wheel assembly alone.

It is therefore an object of this invention to provide a diverter mechanism for conveyors in which the diverter wheels can be selectively raised into the path of the conveyed article without exposing the diverter wheel operating mechanism to torsional impact stresses whenever an article is diverted.

It is a further object of this invention to provide a diverter mechanism for live roller conveyors in which the diverter wheels are positively powered by the drive belt of the conveyor when they are in their raised position.

It is another object of this invention to provide a diverter mechanism for wheel conveyors in which the article-engaging surface of the diverter wheels is formed of a high-friction material such as, e.g. polyurethane.

It is still another object of this invention to provide a diverter mechanism in which the weight of an article being diverted is supported by a fixed load-bearing member rather than being transmitted to the actuating element of the diverter.

It is a still further object of this invention to provide an effective diverter mechanism which is simple in construction and is fully compatible with a standard live roller conveyor without structural changes.

These and other objects of this invention will be apparent from the following specification, taken in connection with the accompanying drawings in which.

Basically, the device of the invention consists of a set of pivotally mounted conveyor wheels which are disposed at an angle to the direction of flow of the conveyor and which can be raised into an active position at a level above the level of the conveyor or to an inactive position where the top of the angularly disposed wheels is below the level of the conveyor.

In the embodiment particularly adapted for live roller conveyors, the raising or lowering of the diverter wheels is accomplished without direct contact between the diverter wheels and the operating mechanism by raising a pressure roller supported by the operating mechanism against the drive belt of the conveyor and causing the drive belt to carry the diverter wheels upward with it. In this manner, the diverter wheels are power-driven when they are in their raised or active position, and they turn with the same tangential velocity as the rollers of the conveyor, thereby eliminating any malfunction due to slippage of the conveyed articles on the diverter wheels or conveyor rollers.

To avoid deleterious wear of the belt of the live roller conveyor due to the friction resulting from the angle between the diverter wheel axes and the direction of motion of the belt, the pressure exerted by the movable pressure roller may be made adjustable. If this is done, an extremely heavy article will cause the diverter wheels to engage a stop on the operating mechanism through which most of the weight of the article is supported. The frictional force between the belt and the diverter wheels is thus limited to the adjustable biasing force which biases the movable pressure roller into engagement with the belt.

In the embodiment particularly adapted for wheeled conveyors, the diverter wheels are raised directly by the operating mechanism, and no drive power is supplied to the diverter wheels. Instead, slippage of the article on the diverter wheels is avoided by a heavily frictional coating on the diverter wheels. In addition, the diverter wheels may be inclined or cantered. In both embodiments, an over-center locking mechanism is provided in the operating mechanism so that power need be applied only to move the diverter wheel assembly from one condition to the other, but not to hold it there.

Figure 1:
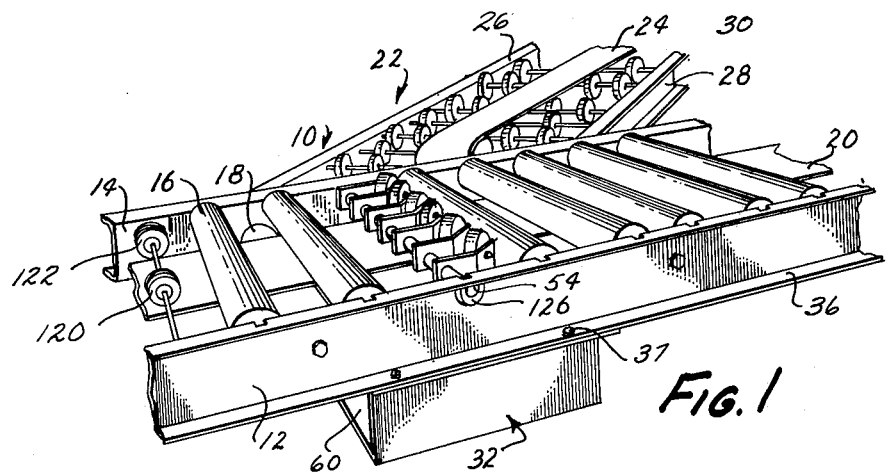
FIG. 1 is a perspective view of a portion of one type of conveyor system showing the environment in which one embodiment of the device of the invention is used.

Referring now to FIG. 1, a standard live roller conveyor or conveyor track is shown at 10. The conveyor 10 consists of a pair of channel-shaped side frames 12, 14 which support carrier rollers 16 and pressure rollers 18. A propelling member or belt 20 is threaded between the pressure rollers 18 and the carrier rollers 16 so as to rotate the carrier rollers 16 to cause them to transport articles along the conveyor. Diverging at an acute angle from the conveyor 10 is a branch conveyor 22 here depicted as a wheel conveyor with an article-engaging drive belt 24. The conveyor 22 is also constructed from standard channel-shaped frame members 26, 28, but in the example shown it uses wheels 30 instead of rollers 16 to support the conveyed object. A diverter 32 is mounted on the conveyor 10 and can be raised or lowered to either pass an article straight through on conveyor 10 or else divert it onto conveyor 22.

Figure 4:
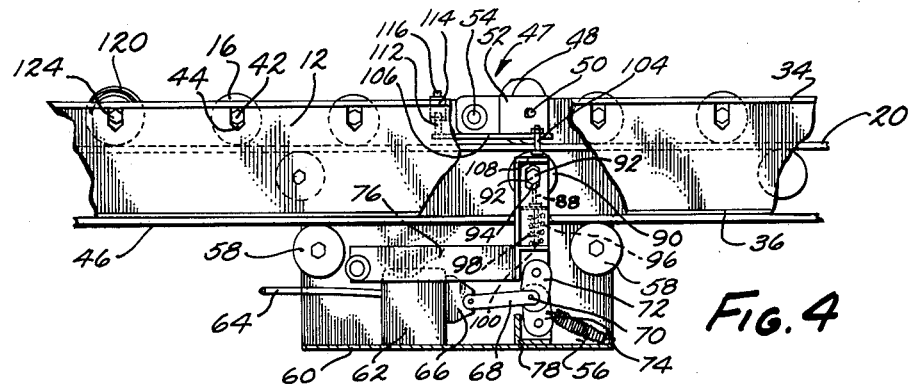
FIG. 4 is a side elevation, partly broken away of the embodiment of FIG. 3, showing the mechanism in the raised position.
Figure 3:
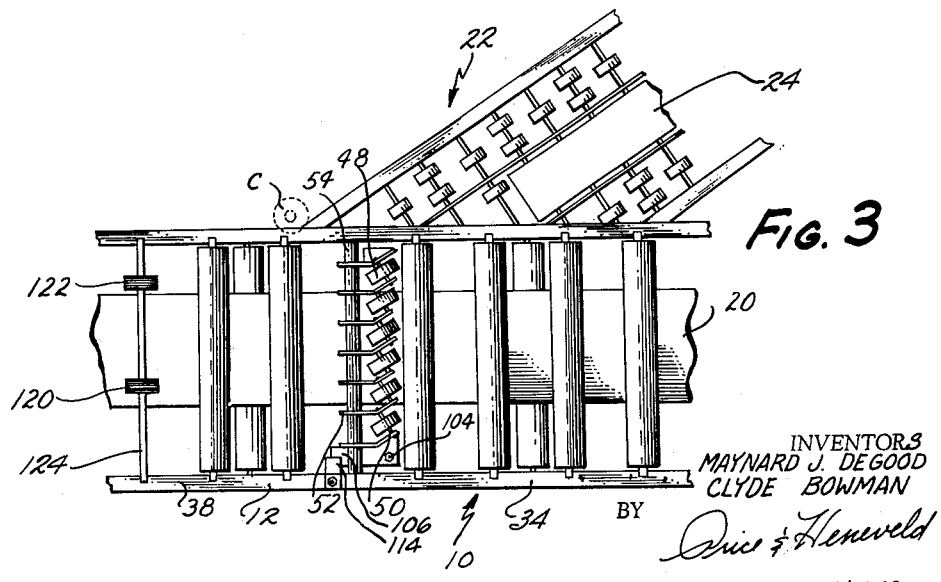
FIG. 3 is a plan view of the embodiment of FIG. 1.
Figure 6:
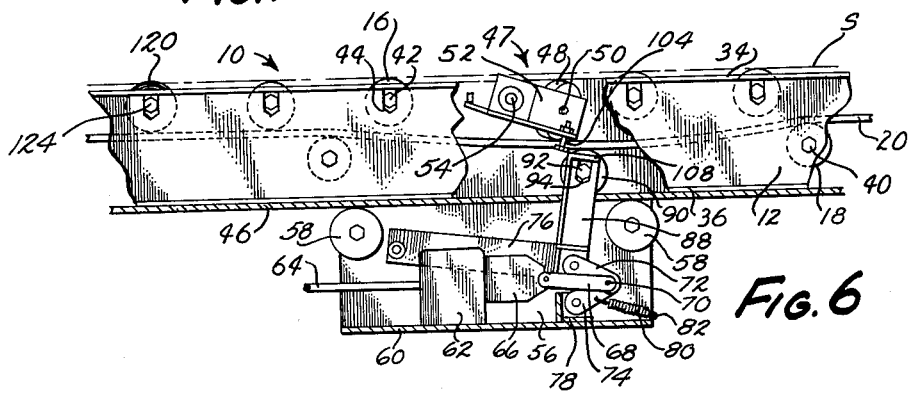
FIG. 6 is a side elevation like FIG. 4, but showing the parts in the lowered position.

Referring now to FIGS. 3, 4 and 6, the conveyor 10 is shown in greater detail with its frame member 12 which has a top accessory flange 34 and a bottom accessory flange 36. The accessory flanges 34, 36 may be provided with regularly spaced mounting holes 38 for attaching accessories such as the diverter mechanism of this invention. Pressure rollers 18 are mounted in the side frame 12 on fixed shafts 40. The belt 20 rests on these pressure rollers 18. The carrier rollers 16 are supported on vertically movable shafts 42 which are slidably engaged in slots 44, and they therefore rest on belt 20 under their own weight. In FIGS. 4 and 6, in order to move articles from left to right, the belt 20 moves from right to left between the pressure rollers 18 and the carrier rollers 16, and from left to right on its return run 46.

In order to divert an article from the conveyor 10, the present invention provides a diverter wheel assembly 47 which can be raised into the path of the article. The diverter wheel assembly 47 comprises a series of diverter wheels 48 which are mounted on axles 50 supported by brackets 52 at approximately a forty-five degree angle to the flow direction of conveyor 10. (FIG. 3). The brackets 52 in turn are pivotally mounted on a bracket shaft 54, about which the entire diverter wheel assembly can freely pivot. As will be readily seen from FIG. 4, the diverter wheel assembly, in the absence of an article being conveyed thereover, rests loosely on belt 20 under its own weight when it is in its raised position. When an article travels over the diverter wheels, the diverter wheels are depressed against the belt 20 and the movable pressure roller 90 until the adjustable stop screw 104 engages the stop plate 108, as discussed in more detail hereinafter. In this condition the axles 50 are exactly horizontal for optimum engagement of the diverter wheels with the article.

Figure 5:
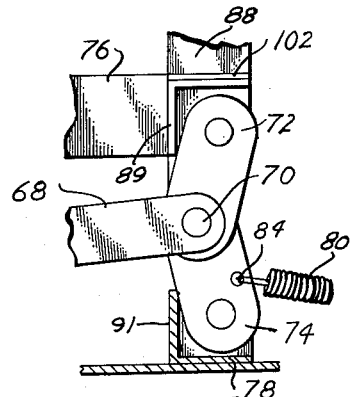
FIG. 5 is an enlarged side elevation of the toggle mechanism in the position of FIG. 4.

The mechanism by which the raising and lowering of the diverter wheels is accomplished is housed in a generally U-shaped frame 56 which can be readily attached to the lower accessory flanges 36 by bolts 37 (FIG. 1). Clearance rollers 58 are mounted in the frame 56 to hold the return portion 46 of belt 20 out of contact with the mechanism of the diverter device. The bottom plate 60 of frame 56 supports an operating device depicted in the drawings as a solenoid 62 powered by any suitable remote control means (not shown) to which it is connected by a cable 64. It should be understood that the operating device may equally well take the form of a pneumatic cylinder or hydraulic device, or any other suitable form, as long as it has an output element capable of linear motion in response to a suitable control signal. In the drawings, the output element of device 62 is the armature 66, to which is attached an operating arm 68. The right end, in the drawings, of arm 68 is connected to a pin 70 on which the toggle links 72, 74 are journalled. The toggle link 72 is additionally journalled in a movable bracket 76, while toggle link 72 is journalled in a fixed bracket 78 mounted on the bottom plate 60. A spring 80 extends between an anchor 82 and an opening 84 (FIGS. 5 and 7) formed in toggle link 74. The spring 80 is stressed in tension so that it tends to collapse the toggle 72, 74.

When the solenoid 62 is energized, it pulls the toggle 72, 74 into the position shown in FIG. 4, against the tension of spring 80. In that position, the weight of an article traveling over the diverter wheels 48 is transmitted to the toggle 72, 74 through stop screw 104, stop plate 108, and vertical arm 88 of the movable bracket 76. As will be readily apparent from FIG. 5, this forces the left-hand edge of toggle links 72, 74 against the flanges 89, 91 of vertical arm 88 and fixed bracket 78, respectively. The weight of the article is thus supported by the toggle links 72, 74 and flanges 89, 91, and is not transmitted to the solenoid 62. Overstressing of solenoid 62 by a heavy article is thus effectively prevented. When the toggle 72, 74 is collapsed by spring 80 following de-energization of solenoid 62, its collapsing movement is limited (see FIG. 7) by abutment of the bottom edge of vertical arm 88 against flange 91 of the fixed bracket 78.

Figure 12:
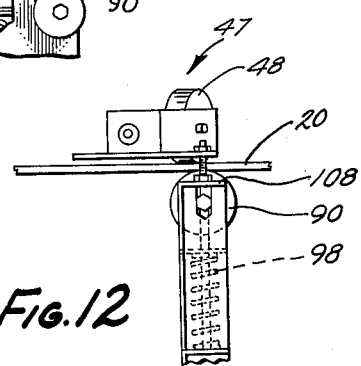
FIG. 12 is a detail view showing details of the belt pressure adjusting means shown in phantom lines in FIG. 4.

The vertical arm 88 of the movable bracket 76 constitutes a guide member in which the movable pressure roller 90 is mounted. The roller 90 is mounted on a shaft 92 which is slidably vertically movable in a groove 94 of the vertical arm 88. The shaft 92 is supported by a supporting bracket 96 (FIG. 12) which is biased upwardly by a compression spring 98 coiled about a guide rod 100. An adjusting nut 101 permits adjustment of the amount of compression of the spring 98. The lower end of guide rod 100 is slidably journalled in the flange 102 of the movable bracket 76. The downward movement of diverter wheels 48 under the weight of an article is limited, as previously mentioned herein, by the engagement of the adjustable stop screw 104 mounted on the flange 106 of the diverter wheel bracket 52, with the stop plate 108 affixed to the top of vertical arm 88. In this condition, the amount of pressure with which the belt 20 is forced against the diverter wheels 48 is independent of the weight of the article and is determined solely by the compression factor of spring 98 as determined by the vertical position of nut 101.

When the toggle 72, 74 is collapsed and the movable bracket is in its lowermost position, the extension 110 of flange 106 of the diverter wheel assembly 47 comes to rest against the adjustable stop pin 112 mounted on the stop clip 114, which is in turn affixed to the upper accessory flange 34 of conveyor 10 by a screw 116 passing through one of the accessory mounting holes 38. In this position of the diverter wheel assembly 47, the diverter wheels 48 are entirely below the level of the conveyor surface S, as is clearly shown in FIG. 6.

Figure 9:
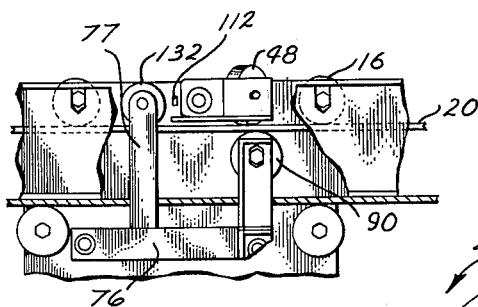
FIG. 9 is a side elevation of still another alternative version of the embodiment of FIG. 1 in the raised position.
Figure 8:
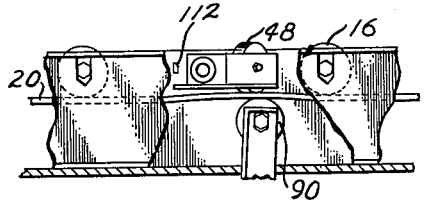
FIG. 8 is a side elevation of an alternative version of the embodiment of FIG. 1 in the raised position.

Usually, in an installation such as that depicted in FIGS. 4 and 6, the tension of the belt is such that it will not drop entirely out of engagement with the diverter wheels 48 when the diverter wheel assembly is in its lowermost position. In many instances, the slight amount of residual engagement of the belt with the diverter wheels is of no consequence, particularly in those applications in which the conveyor operates at relatively slow speeds. If, however, it is desired to completely disengage the belt 20 from the diverter wheels 48 when they are in their lowermost position, either one of the alternatives shown in FIGS. 8 and 9 may be used. In the device of FIG. 8, the diverter wheels 48 are smaller in diameter than the rollers 16. Thus, the movable pressure roller 90 pushes the belt 20 into a convex arch when it is in engagement with the diverter wheels 48 in their raised position, and when the belt 20 returns to its normal position upon lowering of the movable pressure roller 90, it falls entirely clear of the diverter wheels 48.

In the alternative, the dimension of the diverter wheels may be maintained the same as shown in FIGS. 4 and 6, but a separate depressing roller 132 of smaller diameter than the carrier roller 16 may be provided adjacent the movable pressure roller 90. As best appears from FIG. 9, the depressing roller 132 is mounted on top of the belt and moves together with the arm 77 of movable bracket 76. It will be readily seen that when the operating mechanism in the embodiment of FIG. 9 moves to its lowermost position, the depressing roller 132 pulls the belt 20 downward out of engagement with the diverter wheels 48.

Referring now more particularly to FIG. 3, it will be noted that one of the carrier rollers 16 of conveyor 10 has been replaced with a pair of rubber-rimmed wheels 120, 122 forming a pivoting device. One of these wheels rests on the belt 20 and constitutes the drive wheel 120, the other is clear of belt 20 and constitutes the pivot wheel 122. The wheels 120, 122 are positioned upstream of diverter wheels 48 at a distance not more than the length of the shortest article to be handled by the conveyor; preferably, a distance approximately equal to half the length of the average article is used. The pivot wheel end of shaft 124 is preferably provided with a key (not shown) or equivalent means to hold the wheels 120, 122 at a level where both wheels protrude slightly above the conveyor surface S. The wheels 120, 122 assist in turning the article when it is diverted, in a manner described under "Operation" below.

*Assembly*

The assembly of the device of this invention with a conveyor is extremely simple. First, two of the carrier rollers 16 and the pressure roller 18 adjacent to one of them are removed from the conveyor. The frame 56 with all the mechanism mounted thereon, except for the roller 90, is then bolted to the flange 36 of the conveyor 10. Next, the spring-loaded shaft of roller 90 is inserted into supporting brackets 96 and groove 94. The shaft of the diverter wheel assembly is then inserted into the groove 44 from which one of the carrier rollers 16 has been removed and the shims 126 (FIG. 1) are locked in place on shaft 54 to prevent vertical movement thereof. Shaft 124 with its wheels 120, 122 is now inserted into the groove 44 of the other removed carrier roller 16. Finally, the stop clip 114 is bolted to the flange 34 of conveyor 10, and the device is ready to operate.

Due to the simplicity of the mechanism, all the necessary adjustments can be readily made at the factory. If, however, adjustments are necessary, they can be made as follows: The level of the diverter wheels in their raised position with an article resting on them can be adjusted by turning stop screw 104; the level of the diverter wheels in their lowered position can be adjusted by raising or lowering stop pin 112; and the belt pressure against the diverter wheels in their raised position can be adjusted by adjusting nut 101 to the point where the belt pressure is just sufficient to positively drive the diverter wheels 48 under load but insufficient to cause the diverter wheels to damage the belt as a result of their angular position.

*Operation*

Figure 7:
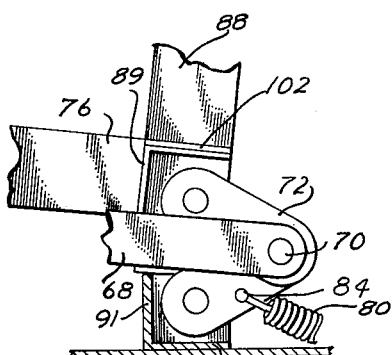
FIG. 7 is an enlarged side elevation of the toggle mechanism in the position of FIG. 6.

In its normal (i.e. deenergized) condition, the device of this invention is in the position shown in FIG. 7, i.e., the toggle 72, 74, is collapsed, and the diverter wheels 48 are lowered below the surface S of the conveyor 10. In this condition, the drive and pivot wheels 120, 122 act together substantially like an oversized carrier roller, and an article traveling along the conveyor passes over the diverter device without any change in direction or velocity.

If it is now desired to divert an article, the solenoid 62 is energized by appropriate means so that it pulls its armature 66 to the left in FIGS. 4 and 6. The mechanism now assumes the condition shown in FIGS. 4 and 5, and the over-center condition of the toggle 72, 74 when erected makes it necessary for the solenoid to overcome only the tension of return spring 80, regardless of any weight applied to the device by the conveyed articles. In the condition of FIG. 4, the movable pressure roller 90 is depressed only by the weight of the belt and of the diverter wheel assembly 47. In this condition, the pressure of the belt 20 against the diverter wheels 48 is just sufficient to keep the diverter wheels rotating while keeping belt wear at a minimum. As an article travels toward the diverter, its leading edge is first raised above the conveyor surface S by the drive and pivot wheels 120, 122. As the forward movement of the article continues, its center of gravity passes beyond the axis of shaft 124, and the article tilts forward slightly until it eventually reaches a position astraddle the diverter wheels 48 and the drive and pivot wheels 120, 122. In that position, the article is supported by the diverter wheels at a point ahead of its center of gravity, and by the pivot wheels 120, 122 at a point to the rear of its center of gravity. The weight of the article on the diverter wheels 48 has depressed the diverter wheel assembly 47 against the bias of spring 98 until the stop screw 104 has come to rest against the stop plate 108. In this condition, the pressure of the belt 20 against the diverter wheels 48 is determined solely by the pre-set compressional stress of spring 98. At this moment, the diverter wheels 48 and movable pressure roller 90 are in the position shown in FIG. 12, and the belt 20 is being pressed against the diverter wheels 48 with a force sufficient to assure positive rotation of the diverter wheels but still insufficient to damage the belt.

As the leading edge of the article rides up onto the diverter wheels 48 (whose axes are substantially horizontal in the condition of FIGS. 4 and 12), the leading edge of the article is diverted upwardly in FIG. 3. Simultaneously, the drive wheel 120 is in engagement with the lower (in FIG. 3) portion of the trailing half of the article and drives it forward. The pivot wheel 122 which is in contact with the upper (in FIG. 3) portion of the trailing half of the article is not, however, driven by belt 20 and is therefore capable of turning backwards. As a result, the article more or less pivots on the pivot wheel 122 and enters into a trajectory diverging from the flow direction of conveyor 10. As the center of gravity of the article moves over the diverter wheels 48, the article tilts forward to bring its leading edge into contact with the belt 24 of the spur conveyor 22. The belt 24 then takes over the manipulation of the article, and the article travels away on the spur conveyor 22.

As described herein, the device of this invention is effective for diverting articles onto a spur conveyor diverging at a forty-five degree angle from the main conveyor. It should be understood, however, that without any change whatever in the structure described so far, the device can also be used for diverting the article onto a right-angle take-off. The only addition necessary to turn the article to ninety degrees rather than forty-five degrees is the provision of a horizontal corner wheel C indicated in phantom in FIG. 3 and arranged to engage the side of the article during its turning movement in a manner well-known to those skilled in the art.

*Modification*

Figure 2:
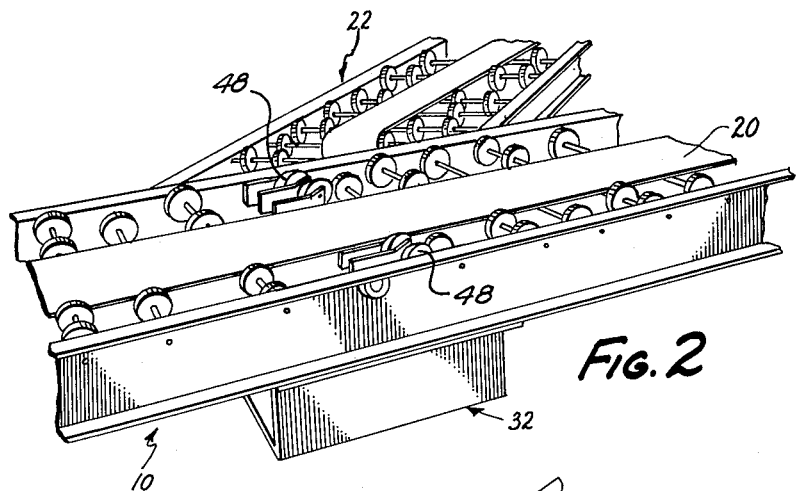
FIG. 2 is a perspective view of a portion of another type of conveyor system showing the environment in which another embodiment of the device of the invention is used.
Figure 10:
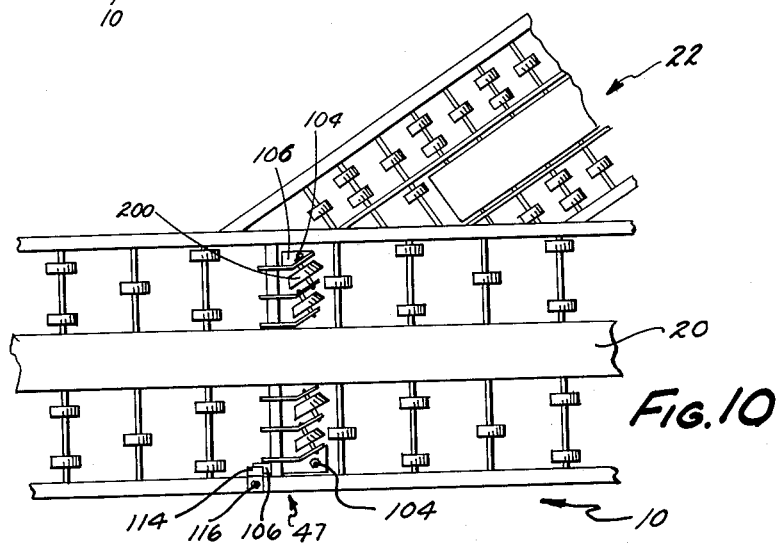
FIG. 10 is a plan view of the embodiment of FIG. 2.
Figure 11:
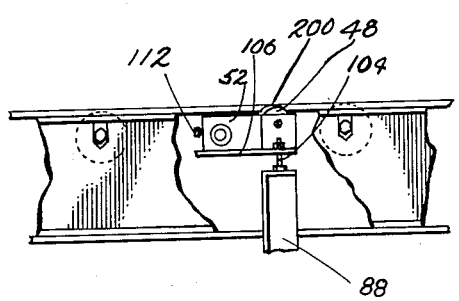
FIG. 11 is a side elevational view of the embodiment of FIG. 2 in the lowered position.

FIGS. 2, 10 and 11 show a modification of the invention in which the main conveyor 10 is of the wheel type rather than the live roller type. It will be noted in this embodiment that the diverter wheels 48 are positioned on each side of the belt 20 but do not come into contact therewith. When the operating mechanism of this embodiment causes the arm 88 to be raised in the same manner as hereinbefore described with respect to the embodiment of the other figures, the motion of the arm 88 is transmitted through setscrew 104 and flange 106 to the diverter wheel brackets 52. The article-engaging surface of the diverter wheels 48 is provided with a polyurethane coating 200. It will be understood that instead of merely coating the diverter wheels with polyurethane, the entire wheel may be made out of that material, or other plastics or material combinations may be used to achieve a high coefficient of friction on the article-engaging surface. It will be noted from the drawings that the surface of the diverter wheels is slightly conical. This is done so as to facilitate the molding process of the coating or wheel, and it also allows the wheel surface to be made horizontal at the point where the article is engaged even though the diverter wheel brackets are not in a horizontal plane when the diverter is in the article engaging position. The high-friction surface of the diverter wheels of this modification makes it possible to divert articles even at extremely high conveying speeds without slippage, and thus the pivot-and-drive-wheel arrangement 120, 122 of the previously described embodiment is made unnecessary.

*Summary*

It will be seen from the above description that the present invention discloses a simple, efficient, and sturdy diverter mechanism for conveyors. In the embodiment of FIG. 1, the fact that the diverter wheels are powered by the main conveyor belt itself causes the diverter wheels to move with the same tangential velocity as the carrier rollers of the main conveyor. This avoids slippage of the articles on the diverter wheels or on the live rollers and consequent stoppage of the articles upon hitting the diverter wheels, as sometimes occurs in unpowered diverters. It also assures diversion of an article resting on the diverter when the conveyor is started up again after having been stopped. In addition, the drive-and-pivot wheel arrangement of the aforementioned co-pending application discussed herein assures positive and accurate turning of the article so that it is transferred onto the spur conveyor in an exactly centered position. In addition, the limitation of the pressure of the belt against the diverter wheels reduces belt wear to a minimum and makes powered diversion economically practical.

In the embodiment of FIG. 2, positive diversion of the article is assured by the high coefficient of friction of the diverter wheel surface even at very high conveying speeds, and even though the diverter wheels are not powered.

In both embodiments, the support of the weight of the article by elements fixed with respect to the conveyor frame makes possible the use of small, lightweight actuating elements and eliminates many maintenance problems.

Obviously, the inventive concepts underlying this invention can be carried out in many different embodiments, of which those described herein are intended to be merely illustrative. Therefore, the invention is not to be considered limited by the embodiments herein described, but only by the scope of the following claims.

We claim:

1. A powered diverter for selectively diverting objects from a conveyor, said conveyor having article supporting and propelling elements, said powered diverter comprising: a plurality of diverter wheels disposed with their axis of rotation at a fixed angle to the flow direction of said conveyor, said diverter wheels normally lying below the surface of said conveyor; a propelling member for driving said article propelling elements and also for driving said diverter wheels when engaged therewith; and actuating means for raising said propelling member into firm engagement with said diverter wheels so as to power the same and simultaneously raising said diverter wheels above the level of said conveyor.

2. The device of claim 1, in which said propelling member remains in residual contact with said diverter wheels when said diverter wheels are in their lowered position.

3. The device of claim 1, in which said propelling member is fully disengaged from said diverter wheels when said diverter wheels are in their lowered position.

4. The device of claim 1 wherein said propelling member is a belt and said actuating means has a rotatable support beneath said belt generally vertically aligned with said diverter wheels; said diverter wheels being mounted for limited vertical movement independently of said support and means to limit the vertical spacing between said diverter wheels and said support and control the pinching effect on said belt.

5. The device of claim 1 wherein said propelling member is a belt and said actuating means has a rotatable support beneath said belt generally vertically aligned with said diverter wheels; said support in its raised position arching said belt upwardly above its normal path of movement; means limiting downward travel of said diverter wheels when said support is lowered, said downward travel being limited at a point where said diverter wheels are suspended above said normal path of movement of and disengage from said belt.

6. A powered diverter for selectively diverting objects from a conveyor comprising: a plurality of diverter wheels disposed at a fixed angle to the flow direction of said conveyor, said diverter wheels normally lying below the surface of said conveyor; a belt carried by supporting rollers for driving said conveyor and also for driving said diverter wheels when engaged therewith; and actuating means comprising a movable supporting roller for raising said belt against said diverter wheels so as to raise them above the level of said conveyor and simultaneously hold said belt in firm engagement with said diverter wheels so as to rotate the same; a depressing roller movable together with said movable supporting roller and positioned to lower said belt out of engagement with said diverter wheels when said diverter wheels are in their lowered position.

7. An article diverter mechanism for powered conveyors comprising: a conveyor track having an article supporting surface and a driven propelling member; diverter wheels mounted on said conveyor track and disposed to direct articles laterally at an angle from said conveyor track, said diverter wheels being positioned at a substantial angle to the direction of article travel on said conveyor track, said diverter wheels being selectively raisable into the path of an article traveling along said conveyor track; and a drive wheel and pivot wheel mounted generally coaxially with one another upstream of said diverter wheels a distance substantially less than the length of an individual article to be diverted so as to be in engagement with said article simultaneously with said diverter wheels, said pivot wheel being adjacent the side of said conveyor track toward which articles are directed by said diverter wheels, said drive wheel being offset from the centerline of said conveyor oppositely from said pivot wheel and in driven engagement with said propelling member; said pivot wheel being spaced from said propelling member and freely rotatable in either direction, said drive wheel cooperating with said diverter wheels to propel an article off said conveyor while said pivot wheel simultaneously acts as a point of rotation for the article being diverted.

8. An article diverter mechanism as described in claim 7 wherein the tops of said drive and pivot wheels project above the article supporting surface of said conveyor track.

References Cited in the file of this patent

UNITED STATES PATENTS

| | | |
|---|---|---|
| 2,001,927 | Van Wyk | May 21, 1935 |
| 2,669,334 | Metzgar | Feb. 16, 1954 |
| 2,988,196 | Byrnes | June 13, 1961 |
| 3,012,652 | Poel | Dec. 12, 1961 |
| 3,036,691 | Byrnes | May 29, 1962 |
| 3,054,514 | Riley | Sept. 18, 1962 |
| 3,058,565 | Byrnes | Oct. 16, 1962 |